United States Patent
Kourtakis et al.

(10) Patent No.: US 11,603,440 B2
(45) Date of Patent: Mar. 14, 2023

(54) POLYIMIDE FILMS AND ELECTRONIC DEVICES

(71) Applicant: DUPONT ELECTRONICS, INC., Wilmington, DE (US)

(72) Inventors: Kostantinos Kourtakis, Media, PA (US); Gene M Rossi, Wilmington, DE (US); Joseph Casey Johnson, Pickerington, OH (US); Michael Thomas Kwasny, Columbus, OH (US)

(73) Assignee: DUPONT ELECTRONICS, INC., Wilmington, DE (US)

( * ) Notice: Subject to any disclaimer, the term of this patent is extended or adjusted under 35 U.S.C. 154(b) by 170 days.

(21) Appl. No.: 16/912,654

(22) Filed: Jun. 25, 2020

(65) Prior Publication Data

US 2021/0079181 A1    Mar. 18, 2021

Related U.S. Application Data

(60) Provisional application No. 62/899,379, filed on Sep. 12, 2019.

(51) Int. Cl.
| | | |
|---|---|---|
| C08L 79/08 | (2006.01) | |
| C08J 5/18 | (2006.01) | |
| C08G 73/10 | (2006.01) | |
| C08K 3/36 | (2006.01) | |
| C08K 3/22 | (2006.01) | |

(52) U.S. Cl.
CPC ............ C08J 5/18 (2013.01); C08G 73/1007 (2013.01); *C08J 2379/08* (2013.01); *C08J 2479/08* (2013.01); *C08K 3/36* (2013.01); *C08K 2003/2227* (2013.01); *C08K 2003/2237* (2013.01); *C08K 2003/2244* (2013.01)

(58) Field of Classification Search
CPC ....... C08J 2379/08; C08J 5/18; C08G 73/104; C08L 79/08; C09D 179/08
See application file for complete search history.

(56) References Cited

U.S. PATENT DOCUMENTS

| | | | |
|---|---|---|---|
| 2,801,185 | A | 7/1957 | Iler |
| 4,522,958 | A | 6/1985 | Das et al. |
| 5,648,407 | A | 7/1997 | Goetz et al. |
| 10,399,310 | B2 | 9/2019 | Nodono et al. |
| 2009/0191362 | A1* | 7/2009 | Tanaka ..................... C09D 5/00 428/1.31 |
| 2019/0153158 | A1* | 5/2019 | Kondo ............... C08G 73/1039 |
| 2020/0131313 | A1 | 4/2020 | Ho et al. |
| 2020/0148844 | A1 | 5/2020 | Ho et al. |

FOREIGN PATENT DOCUMENTS

| | | | |
|---|---|---|---|
| CN | 111205490 A | | 5/2020 |
| CN | 111205642 A | | 5/2020 |
| JP | 4031624 B2 | | 1/2008 |
| JP | 4406921 B2 | | 2/2010 |
| JP | 2018127608 | * | 8/2018 |
| JP | 2019119779 | * | 7/2019 |

* cited by examiner

*Primary Examiner* — Gregory Listvoyb

(57) ABSTRACT

In a first aspect, a polyimide film includes a dianhydride and a diamine. The dianhydride, the diamine or both the dianhydride and the diamine include an alicyclic monomer, an aliphatic monomer or both an alicyclic monomer and an aliphatic monomer. The polyimide film has a b* of 1.25 or less and a yellowness index of 2.25 or less for a film thickness of 50 μm. The polyimide film is formed by: (a) polymerizing the dianhydride and the diamine in the presence of a first solvent to obtain a polyamic acid solution; (b) imidizing the polyamic acid solution to form a substantially imidized solution; (c) casting the substantially imidized solution to form a film; and (d) drying the film.

12 Claims, No Drawings

POLYIMIDE FILMS AND ELECTRONIC DEVICES

FIELD OF DISCLOSURE

The field of this disclosure is polyimide films and electronic devices.

BACKGROUND OF THE DISCLOSURE

Polyimide films can potentially replace rigid glass cover sheets and other substrates which are currently used in display applications, such as organic light-emitting diode (OLED) displays. For example, aromatic polyimides are typically very thermally stable, with glass transition temperatures ($T_g$) of greater than 320° C., and have excellent foldability and rollability, a critical property needed for next-generation flexible displays. For polyimide films used in display applications, in addition to having high transmittance and low haze, the polyimide film also needs to be neutral in color. Typical specifications require that both a* and b* are no greater than 1 color unit from neutral (0) in CIE L*, a*, b* color space coordinates, i.e., the absolute values of a* and b* should be less than 1. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow).

Typical polyimides with fluorinated monomers, which are nearly colorless, still absorb light in the blue or violet wavelengths (400-450 nm) which gives the films a yellow appearance in transmission. The color of the polyimide films is primarily generated from charge transfer absorptions arising from HOMO-LUMO transitions which can occur both within the polymer chains and between polymer chains. Various approaches have been used to alter HOMO-LUMO transition energies or to frustrate interchain interactions. In one approach, a fluorinated monomer is used to alter the HOMO-LUMO transition energies of the polyimide polymer, but still some residual yellow color can be apparent in these polyimide films. Depending on the monomer composition in the polyimide, therefore, b* can be higher than 1. Since the CIE L*, a*, b* color measurement of a film is also dependent on its thickness, achieving a neutral appearance is even more difficult for thicker films, such as those greater than 25 µm.

Alicyclic and aliphatic monomers, when incorporated into a polyimide structure, can lower color by modifying the electronic structure and charge transfer characteristics of the polymer. These monomers would not, by themselves, contribute to any charge transfer transitions. However, a process where the film is formed by casting a polyamic acid solution and curing of the film which is produced results in significant color. The generation of color is more pronounced when curing is performed in air, indicating that a secondary color formation mechanism is occurring.

SUMMARY

In a first aspect, a polyimide film includes a dianhydride and a diamine. The dianhydride, the diamine or both the dianhydride and the diamine include an alicyclic monomer, an aliphatic monomer or both an alicyclic monomer and an aliphatic monomer. The polyimide film has a b* of 1.25 or less and a yellowness index of 2.25 or less for a film thickness of 50 µm. The polyimide film is formed by:

(a) polymerizing the dianhydride and the diamine in the presence of a first solvent to obtain a polyamic acid solution;

(b) imidizing the polyamic acid solution to form a substantially imidized solution;

(c) casting the substantially imidized solution to form a film; and (d) drying the film.

In a second aspect, an electronic device includes the polyimide film of the first aspect.

In a third aspect, a polyimide film includes a dianhydride and a diamine. The dianhydride, the diamine or both the dianhydride and the diamine include an alicyclic monomer, an aliphatic monomer or both an alicyclic monomer and an aliphatic monomer. The polyimide film has a b* of 1.25 or less and a yellowness index of 2.25 or less for a film thickness of 50 µm. The polyimide film is formed by:

(a) polymerizing the dianhydride and the diamine in the presence of a first solvent to obtain a polyamic acid solution;

(b) imidizing the polyamic acid solution to form a first substantially imidized solution;

(c) precipitating a solid polyimide resin from the first substantially imidized solution with an antisolvent;

(d) isolating and drying the solid polyimide resin;

(e) dissolving the solid polyimide resin in a second solvent to form a second substantially imidized solution;

(f) casting the second substantially imidized solution to form a film; and (g) drying the film.

In a fourth aspect, an electronic device includes the polyimide film of the third aspect.

The foregoing general description and the following detailed description are exemplary and explanatory only and are not restrictive of the invention, as defined in the appended claims.

DETAILED DESCRIPTION

In a first aspect, a polyimide film includes a dianhydride and a diamine. The dianhydride, the diamine or both the dianhydride and the diamine include an alicyclic monomer, an aliphatic monomer or both an alicyclic monomer and an aliphatic monomer. The polyimide film has a b* of 1.25 or less and a yellowness index of 2.25 or less for a film thickness of 50 µm. The polyimide film is formed by:

(a) polymerizing the dianhydride and the diamine in the presence of a first solvent to obtain a polyamic acid solution;

(b) imidizing the polyamic acid solution to form a substantially imidized solution;

(c) casting the substantially imidized solution to form a film; and (d) drying the film.

In one embodiment of the first aspect, after (b) and before (c), the substantially imidized solution is filtered to remove insoluble constituents of the solution.

In another embodiment of the first aspect, the dianhydride is selected form the group consisting of 4,4'-(hexafluoroisopropylidene)diphthalic anhydride, 3,3',4,4'-biphenyltetracarboxylic dianhydride, 3,3',4,4'-benzophenonetetracarboxylic dianhydride, 3,3',4,4'-diphenylsulfonetetracarboxylic dianhydride and mixtures thereof. In a specific embodiment, the dianhydride further includes an alicyclic dianhydride selected from the group consisting of cyclobutane-1,2,3,4-tetracarboxylic dianhydride, 1,2,4,5-cyclohexanetetracarboxylic dianhydride, 1,2,3,4-cyclohexanetetracarboxylic dianhydride 1,2,3,4-cyclopentanetetracarboxylic dianhydride, hexahydro-4,8-ethano-1H,3H-benzo[1,2-c:4,5-c']difuran-1,3,5,7-tetrone, 3-(carboxymethyl)-1,2,4-cyclopentanetricarboxylic 1,4:2,3-dianhydride and meso-butane-1,2,3,4-tetracarboxylic dianhydride.

In yet another embodiment of the first aspect, the diamine includes a fluorinated aromatic diamine. In a specific embodiment, the fluorinated aromatic diamine comprises 2,2'-bis(trifluoromethyl) benzidine.

In still another embodiment of the first aspect, the diamine includes an aliphatic diamine selected from the group consisting of 1,2-diaminoethane, 1,6-diaminohexane, 1,4-diaminobutane, 1,5 diaminopentane, 1,7-diaminoheptane, 1,8-diaminooctane, 1,9-diaminononane, 1,10-diaminodecane, 1,11-diaminoundecane, 1,12-diaminododecane, 1,16-hexadecamethylenediamine, 1,3-bis(3-aminopropyl)-tetramethyldisiloxane, isophoronediamine, bicyclo[2.2.2]octane-1,4-diamine and mixtures thereof.

In still yet another embodiment of the first aspect, the diamine includes an alicyclic diamine selected from the group consisting of cis-1,3-diaminocyclobutane trans-1,3-diaminocyclobutane, 6-amino-3-azaspiro[3.3]heptane, and 3,6-diaminospiro[3.3]heptane, bicyclo[2.2.1]heptane-1,4-diamine, isophoronediamine, bicyclo[2.2.2]octane-1,4 diamine, cis-1,4 cyclohexane diamine, trans-1,4 cyclohexane diamine, 1,4-bis(aminomethyl)cyclohexane, 4,4'-methylenebis(cyclohexylamine), 4,4'-methylenebis(2-methyl-cyclohexylamine), bis(aminomethyl)norbornane and mixtures thereof.

In a further embodiment of the first aspect, the polyimide film has a thickness in the range of from 10 to 150 µm.

In still a further embodiment of the first aspect, the polyimide film has a L* of at least 90 and a haze of less than 1%.

In a second aspect, an electronic device includes the polyimide film of the first aspect.

In a third aspect, a polyimide film includes a dianhydride and a diamine. The dianhydride, the diamine or both the dianhydride and the diamine include an alicyclic monomer, an aliphatic monomer or both an alicyclic monomer and an aliphatic monomer. The polyimide film has a b* of 1.25 or less and a yellowness index of 2.25 or less for a film thickness of 50 µm. The polyimide film is formed by:

(a) polymerizing the dianhydride and the diamine in the presence of a first solvent to obtain a polyamic acid solution;

(b) imidizing the polyamic acid solution to form a first substantially imidized solution;

(c) precipitating a solid polyimide resin from the first substantially imidized solution with an antisolvent;

(d) isolating and drying the solid polyimide resin;

(e) dissolving the solid polyimide resin in a second solvent to form a second substantially imidized solution;

(f) casting the second substantially imidized solution to form a film; and (g) drying the film.

In one embodiment of the third aspect, after (e) and before (f), the second substantially imidized solution is filtered to remove insoluble constituents of the solution.

In another embodiment of the third aspect, the first and second solvents are the same or different.

In still another embodiment of the third aspect, the dianhydride is selected form the group consisting of 4,4'-(hexafluoroisopropylidene)diphthalic anhydride, 3,3',4,4'-biphenyltetracarboxylic dianhydride, 3,3',4,4'-benzophenonetetracarboxylic dianhydride, 3,3',4,4'-diphenylsulfonetetracarboxylic dianhydride and mixtures thereof. In a specific embodiment, the dianhydride further includes an alicyclic dianhydride selected from the group consisting of cyclobutane-1,2,3,4-tetracarboxylic dianhydride, 1,2,4,5-cyclohexanetetracarboxylic dianhydride, 1,2,3,4-cyclohexanetetracarboxylic dianhydride 1,2,3,4-dianhydride, hexahydro-4,8-ethano-1H,3H-benzo[1,2-c:4,5-c']difuran-1,3,5,7-tetrone, 3-(carboxymethyl)-1,2,4-cyclopentanetricarboxylic 1,4:2,3-dianhydride and meso-butane-1,2,3,4-tetracarboxylic dianhydride.

In yet another embodiment of the third aspect, the diamine includes a fluorinated aromatic diamine. In a specific embodiment, the fluorinated aromatic diamine comprises 2,2'-bis(trifluoromethyl) benzidine.

In still another embodiment of the third aspect, the diamine includes an aliphatic diamine selected from the group consisting of 1,2-diaminoethane, 1,6-diaminohexane, 1,4-diaminobutane, 1,5 diaminopentane, 1,7-diaminoheptane, 1,8-diaminooctane, 1,9-diaminononane, 1,10-diaminodecane, 1,11-diaminoundecane, 1,12-diaminododecane, 1,16-hexadecamethylenediamine, 1,3-bis(3-aminopropyl)-tetramethyldisiloxane, isophoronediamine, bicyclo[2.2.2]octane-1,4-diamine and mixtures thereof.

In still yet another embodiment of the third aspect, the diamine includes an alicyclic diamine selected from the group consisting of cis-1,3-diaminocyclobutane trans-1,3-diaminocyclobutane, 6-amino-3-azaspiro[3.3]heptane, and 3,6-diaminospiro[3.3]heptane, bicyclo[2.2.1]heptane-1,4-diamine, isophoronediamine, bicyclo[2.2.2]octane-1,4 diamine, cis-1,4 cyclohexane diamine, trans-1,4 cyclohexane diamine, 1,4-bis(aminomethyl)cyclohexane, 4,4'-methylenebis(cyclohexylamine), 4,4'-methylenebis(2-methyl-cyclohexylamine), bis(aminomethyl)norbornane and mixtures thereof.

In a further embodiment of the third aspect, the polyimide film has a thickness in the range of from 10 to 150 µm.

In still a further embodiment of the third aspect, the polyimide film has a L* of at least 90 and a haze of less than 1%.

In a fourth aspect, an electronic device includes the polyimide film of the third aspect.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Useful organic solvents include: N-methylpyrrolidone (NMP), dimethylacetamide (DMAc), methyl ethyl ketone (MEK), N,N'-dimethyl-formamide (DMF), dimethyl sulfoxide (DMSO), tetramethyl urea (TMU), glycol ethyl ether, diethyleneglycol diethyl ether, 1,2-dimethoxyethane (monoglyme), diethylene glycol dimethyl ether (diglyme), 1,2-bis-(2-methoxyethoxy) ethane (triglyme), gamma-butyrolactone, and bis-(2-methoxyethyl) ether, tetrahydrofuran (THF), ethyl acetate, hydroxyethyl acetate glycol monoacetate, acetone and mixtures thereof. In one embodiment, preferred solvents include N-methylpyrrolidone (NMP) and dimethylacetamide (DMAc).

Diamines

In one embodiment, a suitable diamine for forming the polyimide film can include an aliphatic diamine, such as 1,2-diaminoethane, 1,6-diaminohexane, 1,4-diaminobutane, 1,5 diaminopentane, 1,7-diaminoheptane, 1,8-diaminooctane, 1,9-diaminononane, 1,10-diaminodecane (DMD), 1,11-diaminoundecane, 1,12-diaminododecane (DDD), 1,16-hexadecamethylenediamine, 1,3-bis(3-aminopropyl)-tetramethyldisiloxane, and combinations thereof. Other aliphatic diamines suitable for practicing the invention include those having six to twelve carbon atoms or a combination of longer chain and shorter chain diamines so long as both developability and flexibility are maintained. Long chain aliphatic diamines may increase flexibility.

In one embodiment, a suitable diamine for forming the polyimide film can include an alicyclic diamine (can be fully or partially saturated), such as a cyclobutane diamine (e.g., cis- and trans-1,3-diaminocyclobutane, 6-amino-3-azaspiro[3.3]heptane, and 3,6-diaminospiro[3.3]heptane), bicyclo[2.2.1]heptane-1,4-diamine, isophoronediamine, and bicyclo[2.2.2]octane-1,4 diamine. Other alicyclic diamines can include cis-1,4 cyclohexane diamine, trans-1,4 cyclohexane diamine, 1,4-bis(aminomethyl)cyclohexane, 4,4'-methylenebis(cyclohexylamine), 4,4'-methylenebis(2-methyl-cyclohexylamine), bis(aminomethyl)norbornane.

In one embodiment, a suitable diamine for forming the polyimide film can further include a fluorinated aromatic diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)- hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-tri-fluoromethyldiphenyloxide, 2,2-Bis[4'(4"-aminophenoxy)phenyl] phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB).

In one embodiment, any number of additional diamines can be used in forming the polyimide film, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diaminoterphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene and 2,4,6-trimethyl-1,3-diaminobenzene.

Dianhydrides

In one embodiment, any number of suitable dianhydrides can be used in forming the polyimide film. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyltetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyltetracarboxylic dianhydride, 2,3,3',4'-biphenyltetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic dianhydride, ethylene tetracarboxylic dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl)propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride and thiophene-2,3,4,5-tetracarboxylic dianhydride.

In one embodiment, a suitable dianhydride can include an alicyclic dianhydride, such as cyclobutane-1,2,3,4-tetracarboxylic diandydride (CBDA), 1,2,4,5-cyclohexanetetracarboxylic dianhydride, 1,2,3,4-cyclohexanetetracarboxylic dianhydride, 1,2,3,4-tetramethyl-1,2,3,4-cyclobutanetetracarboxylic dianhydride, 1,2,3,4-cyclopentanetetracarboxylic dianhydride (CPDA), hexahydro-4,8-ethano-1H,3H-benzo[1,2-c:4,5-c']difuran-1,3,5,7-tetrone (BODA), 3-(carboxymethyl)-1,2,4-cyclopentanetricarboxylic 1,4:2,3-dianhydride (TCA), and meso-butane-1,2,3,4-tetracarboxylic dianhydride. In one embodiment, an alicyclic dianhydride can be present in an amount of about 70 mole percent or less, based on the total dianhydride content of the polyimide.

In one embodiment, a suitable dianhydride for forming the polyimide film can include a fluorinated dianhydride, such as 4,4'-(hexafluoroisopropylidene)diphthalic anhydride (6FDA) and 9,9-bis (trifuoromethyl)-2,3,6,7-xanthene tetracarboxylic dianhydride. In a specific embodiment, the fluorinated dianhydride is 4,4'-(hexafluoroisopropylidene)diphthalic anhydride (6FDA).

Polyimide Films

In one embodiment, a polyimide film can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

Useful methods for producing polyamic acid solutions in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the components are added in part or in whole in any order to either part or whole of the solvent, also where part or all of any component can be added as a solution in part or all of the solvent.

(i) A method of first reacting one of the dianhydride components with one of the diamine components giving a first polyamic acid. Then reacting another dianhydride component with another amine component to give a second polyamic acid. Then combining the amic acids in any one of a number of ways prior to imidization.

In one embodiment, a polyamic acid solution can be combined with conversion chemicals like: (i) one or more dehydrating agents, such as, aliphatic acid anhydrides and/or aromatic acid anhydrides (acetic anhydride, propionic anhydride, n-butyric anhydride, benzoic anhydride, trifluoroacetic anhydride and others); and (ii) one or more catalysts, such as, aliphatic tertiary amines (triethyl amine, etc.), aromatic tertiary amines (dimethyl aniline, etc.) and heterocyclic tertiary amines (pyridine, alpha, beta and gamma picoline (2-methylpyridine, 3-methylpyridine, 4-methylpyridine), isoquinoline, etc.). The anhydride dehydrating material is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used.

In one embodiment, a conversion chemical can be an imidization catalyst (sometimes called an "imidization accelerator") that can help lower the imidization temperature and shorten the imidization time. Typical imidization catalysts can range from bases such as imidazole, 1-methylimidazole, 2-methylimidazole, 1,2-dimethylimidazole, 2-phenylimidazole, benzimidazole, isoquinoline, substituted pyridines such as methyl pyridines, lutidine, and trialkylamines and hydroxy acids such as isomers of hydroxybenzoic acid. The ratio of these catalysts and their concentration in the polyamic acid layer will influence imidization kinetics and the film properties.

In one embodiment, the polyamic acid solution can be heated, optionally in the presence of the imidization catalyst, to partially or fully imidize the polyamic acid, converting it to a polyimide. Temperature, time, and the concentration and choice of imidization catalyst can impact the degree of imidization of the polyamic acid solution. Preferably, the solution should be substantially imidized. In one embodiment, for a substantially polyimide solution, greater than 85%, greater than 90%, or greater than 95% of the amic acid groups are converted to the polyimide, as determined by infrared spectroscopy.

In one embodiment, the solvated mixture (the substantially imidized solution) can be cast to form a polyimide film. In another embodiment, the solvated mixture (the first substantially imidized solution) can be precipitated with an antisolvent, such as water or alcohols (e.g., methanol, ethanol, isopropyl alcohol), and the solid polyimide resin can be isolated. For instance, isolation can be achieved through filtration, decantation, centrifugation and decantation of the supernatant liquid, distillation or solvent removal in the vapor phase, or by other known methods for isolating a solid precipitate from a slurry. In one embodiment, the precipitate can be washed to remove the catalyst. After washing, the precipitate may be substantially dried, but need not be completely dry. The polyimide precipitate can be re-dissolved in a second solvent, such as methyl isobutyl ketone (MIBK), methyl ethyl ketone (MEK), ethyl acetate, methyl acetate, ethyl formate, methyl formate, tetrahydrofuran, acetone, DMAc, NMP and mixtures thereof, to form a second substantially imidized solution (a casting solution), which can be cast to form a polyimide film.

The casting solution can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. Inorganic fillers can include thermally conductive fillers, metal oxides, inorganic nitrides and metal carbides, and electrically conductive fillers like metals. Common inorganic fillers are alumina, silica, diamond, clay, boron nitride, aluminum nitride, titanium dioxide, dicalcium phosphate, and fumed metal oxides. Low color organic fillers, such as polydialkylfluorenes, can also be used.

In one embodiment, the substantially imidized polyimide solution can be cast or applied onto a support, such as an endless belt or rotating drum, to form a film. Alternatively, it can be cast on a polymeric carrier such as PET, other forms of Kapton® polyimide film (e.g., Kapton® HN or Kapton® OL films) or other polymeric carriers. Next, the solvent containing-film can be converted into a film by heating to partially or fully remove the solvent. In some aspects of the invention, the film is separated from the carrier before drying to completion. Final drying steps can be performed with dimensional support or stabilization of the film. In other aspects, the film is heated directly on the carrier.

The thickness of the polyimide film may be adjusted, depending on the intended purpose of the film or final application specifications. In one embodiment, the polyimide film has a total thickness in a range of from about 10 to about 150 µm, or from about 10 to about 100 µm, or from about 25 to about 80 µm.

In one embodiment, the polyimide film has a b* of less than about 1.25, or less than about 1.0 or less than about 0.8 for a film thickness of about 50 µm, when measured with a dual-beam spectrophotometer, using D65 illumination and 10 degree observer, in total transmission mode over a wavelength range of 360 to 780 nm. In one embodiment, the polyimide film has a yellowness index (YI) of less than about 2.25, or less than about 2.0 or less than about 1.75 for a film thickness of about 50 µm, when measured using the procedure described by ASTM E313.

Applications

In one embodiment, a polyimide film can be used for a number of layers in electronic device applications, such as in an organic electronic device. Nonlimiting examples of such layers include device substrates, touch panels, substrates for color filter sheets, cover films, and others. The particular materials' properties requirements for each application are unique and may be addressed by appropriate composition(s) and processing condition(s) for the polyimide films disclosed herein. Organic electronic devices that may benefit from having a coated film include, but are not limited to, (1) devices that convert electrical energy into radiation (e.g., a light-emitting diode, light emitting diode display, lighting device, luminaire, or diode laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), (4) devices that convert light of one wavelength to light of a longer wavelength, (e.g., a down-converting phosphor device); and (5) devices that include one or more electronic components that include one or more organic semi-conductor layers (e.g., a transistor or diode).

The advantageous properties of this invention can be observed by reference to the following examples that illustrate, but do not limit, the invention. All parts and percentages are by weight unless otherwise indicated.

EXAMPLES

Test Methods

Measurement of CIE L*, a*, b* Color and Yellowness Index

Color measurements were performed using a ColorQuest® XE dual-beam spectrophotometer (Hunter Associates Laboratory, Inc., Reston, Va.), using D65 illumination and 10 degree observer, in total transmission mode over a wavelength range of 360 to 780 nm. Yellowness Index (YI) was measured using the procedure described by ASTM E313.

Transmittance and Haze

Transmittance and haze were measured using a HazeGuard Plus (BYK-Gardner GmbH, Germany), with the haze measured in transmission by collecting forward scattered light using the method described by ASTM1003. Percent haze was determined by measuring the amount of light which deviates from the incident beam by more than 2.5 degrees on average.

Percent Imidization

A polyimide film was cast from solution and dried at 25° C. (10 millitorr) for 16 hours. Attenuated Total Reflectance Fourier Transform Infra-Red (ATR-FTIR) spectroscopy measurements were performed with a single bounce germanium ATR accessory, installed in a FTIR spectrometer (Nicolet™ iS50, Thermo Fisher Scientific, Inc., Waltham, Mass.). The ratio of intensities at 1365 cm$^{-1}$ (polyimide C-N) relative to 1492 cm$^{-1}$ (aromatic stretch used as an internal standard) was used to characterize cure, relative to a sample prepared with standard curing methods that was defined as being 100% cured. Both sides of the film were measured to determine the overall percent imidization.

Thickness

Coating thickness was determined by measuring coated and uncoated samples in 5 positions across the profile of the film using a contact-type FISCHERSCOPE MMS PC2 modular measurement system thickness gauge (Fisher Technology Inc., Windsor, Conn.).

Comparative Examples 1 and 2

For the polyamic acid (PAA) solution of Comparative Examples 1 and 2 (CE1-CE2) with a monomer composition of CBDA 0.4/6FDA 0.6//TFMB 1.0, into a 500-ml nitrogen purged resin kettle, 61.2547 g of trifluoromethylbenzidine (TFMB, Seika Corp., Wakayama Seika Kogyo Co., LTD., Japan) was added along with 381.96 g of dimethyl acetamide (DMAc, HPLC grade). 50.5138 g of 4,4'-(hexafluoroisopropylidene)diphthalic anhydride (6FDA, Synasia Inc., Metuchen, N.J.) and 14.7049 g of cyclobutane-1,2,3,4-tetracarboxylic dianhydride (CBDA, Wilshire Technologies, Princeton, N.J.) were added in three aliquots over three 5-10 minute intervals. An additional 94.49 g of DMAc was added. The reaction mixture was held at 40° C. during these additions.

The polymer was polymerized ("finished") to ~975 poise (weight average molecular weight, $M_w$=290,480 Daltons, PDI 2.17) using small additions of 6 wt % 6FDA solution in DMAc.

The polyamic acid was de-gassed using a centrifugal-planetary mixer (THINKY USA, Laguna Hills, Calif.) to force the gas from the pre-polymer at 2000 rpm for 2 minutes followed by 2200 rpm for 2 minutes. This procedure was repeated if further de-gassing of the polymer was needed.

47.00 g of this polyamic acid solution in DMAc was placed in a freezer and cooled to ~−5° C. 3.48 g of b-picoline (Sigma-Aldrich, Milwaukee, Wis.) and 3.81 g of acetic anhydride (Sigma-Aldrich) were combined with the polyamic acid mixture at ~−5° C. The polyamic acid mixture with beta-picoline and acetic anhydride was maintained at −5 to −10° C. to minimize imidization of the solution. It was mixed and de-gassed using the centrifugal-planetary mixer to force the gas from the pre-polymer at 2000 rpm for 1 minute followed by 2200 rpm for 30 seconds.

The solution was cast onto a glass plate at 25° C. using a doctor blade with a 25-mil clearance to produce ~2 mil films after curing. The film on the glass substrate was heated to 80° C. for 30 minutes and was subsequently lifted off the glass surface and mounted onto a 4×8 inch pin frame. The mounted film was placed in a furnace (Thermolyne™ F6000 box furnace, Thermo Fisher Scientific, Inc., Waltham, Mass.). The furnace was purged with nitrogen and heated according to the following temperature protocol:

25 to 45° C. (5° C./min), hold at 45° C. for 5 minutes;
45 to 150° C. (20° C./min), hold at 150° C. for 10 minutes;
150 to 250° C. (20° C./min), hold at 250° C. for 10 minutes;
250 to 300° C. (20° C./min), hold at 300° C. for 5 minutes.

The films were removed "hot" from the oven after heating to 300° C. for 5 minutes and allowed to cool in air.

Example 1

For Example 1 (E1), to prepare a substantially imidized polyimide solution (polyimide amic acid solution), 60.83 g of the PAA solution from CE1/CE2 was added to a 500-ml nitrogen purged resin kettle. 4.50 g of beta-picoline and 4.93 g of acetic anhydride were combined with the PAA solution. An additional 6.21 g of DMAc was added. The reaction mixture was stirred unheated for 30 minutes then heated to 80° C. for 1 hour to imidize the solution. 43.0 g of cooled polymer solution was poured into 100 g of rapidly stirring methanol in a blender. The pulverized polymer solid was allowed to stir in the blender for 10 minutes before collection by filtration. The polymer was dried under vacuum at 25° C. for ~16 hours. The dried polymer was added to 43.19 g of DMAc and mixed in the centrifugal-planetary mixer to obtain a solution. Infrared data shows that the polymer is substantially converted (96.1%) to the polyimide form.

The solution was de-gassed using the centrifugal-planetary mixer to force the gas from the polymer at 2000 rpm for 2 minutes followed by 2200 rpm for 2 minutes. This procedure was repeated if further de-gassing of the polymer was needed.

The solution was cast onto a glass plate at 25° C. using a doctor blade with a 20-mil clearance to produce ~2 mil cured films. The film on the glass substrate was heated to 80° C. for 30 minutes and was subsequently lifted off the glass surface and mounted onto a 4×8 inch pin frame. The mounted film was placed in a furnace. The furnace was purged with nitrogen and heated following the same temperature protocol as described above for CE1/CE2. The film was removed "hot" from the oven after heating to 300° C. for 5 minutes and allowed to cool in air.

Example 2

For Example 2 (E2), the same procedure as described for E1 was used to form the solution and prepare the film, but a different heating profile was used, stopping at a lower temperature for the final cure. The mounted film was placed in the furnace, which was then purged with nitrogen and heated according to the following temperature protocol:

25 to 45° C. (5° C./min), hold at 45° C. for 5 minutes;
45 to 150° C. (20° C./min), hold at 150° C. for 10 minutes;
150 to 250° C. (20° C./min), hold at 250° C. for 15 minutes;

The film was removed "hot" from the oven after heating to 250° C. for 15 minutes and allowed to cool in air.

Comparative Examples 3 and 4

For Comparative Examples 3 and 4 (CE3-CE4), a PAA solution as described above for CE1-CE2 was de-gassed using the centrifugal-planetary mixer to force the gas from the pre-polymer at 2000 rpm for 2 minutes followed by 2200 rpm for 2 minutes. This procedure was repeated if further de-gassing of the polymer was needed.

The solution was cast onto a glass plate at 25° C. using a doctor blade with a 25-mil clearance to produce ~2 mil cured films. The film on the glass substrate was heated to 80° C. for 30 minutes and was subsequently lifted off the glass surface and mounted onto a 4×8 inch pin frame. The mounted film was placed in a furnace. The furnace was purged with nitrogen and heated following the same temperature protocol as described above for CE1/CE2. The films were removed "hot" from the oven after heating to 300° C. for 5 minutes and allowed to cool in air.

As shown in Table 1 for the films of CE1-CE4 and E1-E2, all with the same monomer composition of CBDA 0.4/ 6FDA 0.6//TFMB 1.0, E1 and E2 provide good optical properties, with low color (b*) and low yellowness index (YI), while maintaining good transparency (L*) and low haze. The comparison between E1 and CE1-CE2 is especially interesting and surprising. Although the polymer, catalysts, catalyst concentrations, and heating procedures for the films were identical, for E1, the catalyst was separated (removed) from the imidized solution prior to casting and heating to form the film. In CE1-CE2, the catalyst is not removed from the polyamic acid, and the polyamic acid solution is maintained at −5 to −10° C. prior to casting (to help suppress imidization), and all three (E1 and CE1-CE2) are cast and cured in the same manner. CE3 and CE4 demonstrate that using a catalyst-free thermal imidization process for these same monomer compositions can produce films with good transparency and low haze, but their color and yellowness is much higher than the films produced using the polyimide solutions of E1 and E2.

TABLE 1

| Example | Thickness (μm) | a* | b* | L* | YI (E313) | Haze (%) |
|---|---|---|---|---|---|---|
| CE1 | 55.1 | −0.21 | 1.32 | 96.20 | 2.35 | 0.15 |
| CE2 | 55.6 | −0.25 | 1.54 | 96.17 | 2.74 | 0.08 |
| E1 | 49.8 | −0.08 | 0.89 | 96.15 | 1.62 | 0.12 |
| E2 | 47.8 | −0.04 | 0.71 | 96.30 | 1.32 | 0.07 |
| CE3 | 68.1 | −0.71 | 4.55 | 95.45 | 8.00 | 0.27 |
| CE4 | 56.6 | −0.52 | 3.08 | 95.68 | 5.43 | 0.21 |

Example 3

For Example 3 (E3), 0.428 g of 3,3',4,4'-biphenyltetracarboxylic dianhydride (BPDA, Mitsubishi Chemical Co., Japan), 1.998 g of CBDA, 2.586 g of 6FDA and 5.663 g of TFMB were combined with 30.998 g of DMAc in a 150 ml THINKY container to prepare a polyamic acid solution with a monomer composition of BPDA 0.083/CBDA 0.583/ 6FDA 0.33//TFMB 1.0. The container was placed on a roller mill for 12 hours to allow the mixture to react and form the polyamic acid solution. The solution was subsequently agitated in the centrifugal-planetary mixer for 5 minutes, after which it was diluted with 16 g of DMAc to reach a weight fraction (solid monomer concentration in solution) of 16 wt % and the material was mixed on the centrifugal-planetary mixer for 5 more minutes and then placed on the roll mill for 2 more hours.

To 66.63 g of the polyamic acid solution, 4.085 g of beta-picoline and 4.478 g of acetic anhydride were added. The polyamic acid mixture was transferred to a larger 250 ml THINKY cup, and an additional 80.3 g of DMAc was added to further dilute the mixture and bring the final weight fraction of the solution to 6.8 wt %, based on the total content of monomers and catalyst. The polyamic acid mixture was placed the centrifugal-planetary mixer for 5 minutes at 2000 rpm to initiate the imidization reaction. During that time, the polyamic acid solution with the catalyst was slightly warmed due to the agitation of the solution.

The solution was de-gassed using the centrifugal-planetary mixer to force the gas from the polymer at 2000 rpm for 2 minutes followed by 2200 rpm for 2 minutes. This procedure was repeated if further de-gassing of the polymer was needed.

The solution was cast onto a glass plate at 25° C. using a doctor blade with a 20-mil clearance to produce ~2 mil cured films. The film on the glass substrate was heated to 110° C. for 60 minutes and was subsequently lifted off the glass surface and mounted onto a 4×8 inch pin frame. The mounted film was placed in a furnace. The furnace was purged with nitrogen and heated according to the following temperature protocol:

25 to 45° C. (5° C./min), hold at 45° C. for 5 minutes;
45 to 150° C. (20° C./min), hold at 150° C. for 10 minutes;
150 to 220° C. (20° C./min), hold at 220° C. for 15 minutes.

The films were removed "hot" from the oven after heating to 220° C. for 15 minutes and allowed to cool in air.

Example 4

For Example 4 (E4), the same procedure as described for E1 for the preparation of polyamic acid and polyimide resin was used with the following differences. 66.713 g of TFMB was added along with 479.66 g of DMAc, 36.571 g of 6FDA and 24.219 g of CBDA to prepare a polyamic acid solution with a monomer composition of CBDA 0.6/6FDA 0.4//TFMB 1.0.

The polymer was "finished" to 1475 poise (weight average molecular weight, $M_w$=363,739 Daltons, PDI 2.18) using small additions of 6 wt % 6FDA solution in DMAc.

As described in E1, a portion of the polyamic acid was converted to polyimide, the polymer isolated by precipitation and the dried resin dissolved and cast into films with the following differences. To 103.50 g of polyamic acid solution in a 500-ml liter nitrogen purged resin kettle, 8.268 g of beta-picoline and 9.064 g of acetic anhydride were added. 11.75 g of the polyimide resin was combined with 45.0 g of DMAc and mixed to obtain a solution and cast as a film.

The mounted film was placed in a furnace. The furnace was purged with nitrogen and heated according to the following temperature protocol:

25 to 45° C. (5° C./min), hold at 45° C. for 5 minutes;
45 to 150° C. (20° C./min), hold at 150° C. for 10 minutes;
150 to 250° C. (20° C./min), hold at 250° C. for 15 minutes.

The films were removed "hot" from the oven after heating to 250° C. for 15 minutes and allowed to cool in air.

Comparative Example 5

For the PAA solution of Comparative Example 5 (CE5), with a monomer composition of CBDA 0.6/6FDA 0.4//TFMB 1.0, to a 1-liter nitrogen purged resin kettle, 50 g of TFMB was added along with 618.55 g of DMAc. 27.411 g of 6FDA and 18.151 g of CBDA were added in three aliquots over three 5-10 minute intervals. An additional 154.64 g of DMAc was added to create a 11 wt % solution. The reaction mixture was held at 40° C. during these additions. The polymer was "finished" to ~26 poise using small additions of 6FDA monomer.

A small amount of the polyamic acid was de-gassed using the centrifugal-planetary mixer to force the gas from the pre-polymer at 2000 rpm for 2 minutes followed by 2200 rpm for 2 minutes. This procedure was repeated if further de-gassing of the polymer was needed.

The solution was cast on PET film at 25° C. using a doctor blade with 40 mil clearance to produce ~2 mil films after curing. The film on the PET substrate was heated to 50° C. and 80° C. for 30 minutes and was subsequently lifted off the substrate and mounted onto a 4×8 inch pin frame. The mounted film was placed in a furnace (HTMA 6/28, Carbolite Gero Ltd., Newtown, Pa.). The furnace was purged with nitrogen and heated according to the following temperature protocol:

25 to 45° C. (5° C./min), no hold at 45° C.;
45 to 150° C. (7° C./min), hold at 150° C. for 10 minutes;
150 to 250° C. (7° C./min), hold at 250° C. for 10 minutes;
250 to 320° C. (7° C./min), hold at 320° C. for 5 minutes.

The films were removed "hot" from the oven after heating to 320° C. for 5 minutes and allowed to cool in air. The films were brittle and shattered in the oven.

Example 5

For Example 5 (E5), with a monomer composition of ODPA 0.1/CBDA 0.6/6FDA 0.3//TFMB 1.0, the same procedure as described with E1 was used, but with the following differences for the preparation of the polyamic acid solution. 35.0 g of TFMB was added along with 529.5 g of DMAc solvent. 14.39 g of 6FDA, 12.71 g of CBDA, and 3.35 g of 4,4'-oxydiphthalic anhydride (ODPA, Wilshire Technologies). An additional 0.13 g of 6FDA monomer was added, in 1 gram in DMAc to increase the viscosity and molecular weight of the polymer.

As described in E1, the polyamic acid was converted to a polyimide solution, the polymer isolated by precipitation and the dried resin dissolved and cast into films with the following differences. To 595 g of the polyamic acid solution in a nitrogen purged resin kettle, 26.02 g of beta-picoline and 28.52 g of acetic anhydride were added. The dried resin was dissolved in DMAc as described in E1.

The mounted film was placed in a furnace. The furnace was purged with nitrogen and heated according to the following temperature protocol:

25 to 45° C. (5° C./min), hold at 45° C. for 5 minutes;
45 to 150° C. (20° C./min), hold at 150° C. for 10 minutes;
150 to 250° C. (20° C./min), hold at 250° C. for 15 minutes.

The films were removed "hot" from the oven after heating to 250° C. for 15 minutes and allowed to cool in air.

Table 2 shows that polyimide films with excellent optical properties can be produced using a range of aromatic/aliphatic dianhydride monomer compositions, such as BPDA 0.083/CBDA 0.583/6FDA 0.33//TFMB 1.0 (E3), CBDA 0.6/6FDA 0.4//TFMB 1.0 (E4) and ODPA 0.1/CBDA 0.6/6FDA 0.3//TFMB 1.0 (E5). CE5 demonstrates that forming a polyimide film directly from the PAA solution with the same monomer composition as E4, but using a catalyst-free thermal imidization process does not produce a film with the desired optical properties.

TABLE 2

| Example | Thickness (μm) | a* | b* | L* | YI (E313) | Haze (%) |
|---|---|---|---|---|---|---|
| E3 | 32.4 | −0.03 | 0.82 | 96.0 | 1.54 | 0.28 |
| E4 | 47.0 | −0.03 | 0.94 | 96.0 | 1.77 | 0.34 |
| E5 | 56.6 | −0.11 | 0.91 | 96.09 | 1.65 | — |
| CE5 | 55.1 | −0.23 | 1.56 | 96.10 | 2.79 | 1.06 |

Example 6

For the PAA solution of Example 6 (E6) with a monomer composition of CBDA 0.6/6FDA 0.4//TFMB 0.75/HMDA 0.25, into a 300-ml beaker in a nitrogen purged glove box 4.497 g of TFMB and 0.985 g of 4,4'-methylenebis(cyclohexylamine) (HMDA, Sigma Aldrich) was added along with 89 g of DMAc. 2.199 g of CBDA and 3.320 g of 6FDA was added in three aliquots over three 5-10 minute intervals. The reaction mixture was held at 40° C. during these additions.

The reaction was held at 40° C. overnight to a weight average molecular weight, $M_w$=156,000 g/mol with a dispersity of 2.14.

For E6, to prepare a substantially imidized polyimide solution (polyimide amic acid solution), 4.36 g of beta-picoline and 4.78 g of acetic anhydride were combined with the PAA solution. The reaction mixture was stirred at 40° C. for 30 minutes then heated to 80° C. for 3 hours to imidize the solution. 100 g of room temperature polymer solution was poured into 300 ml of methanol (Sigma Aldrich) in a blender and rapidly stirred to pulverize the polymer solid. The pulverized polymer solid was allowed to stir in the blender for 10 minutes before collection by filtration. The polymer solid was then washed with an additional 100 ml of methanol. The polymer was air dried overnight.

For E6, 5 g of the dried polymer resin was added to 45 g of DMAc and mixed in a centrifugal-planetary mixer to obtain a solution. The solution was de-gassed using the centrifugal-planetary mixer to force the gas from the polymer at 2000 rpm for 10 minutes.

The solution was cast onto a glass substrate at 25° C. to produce 1-2 mil cured films. The film on the glass substrate was heated to 80° C. for 25 minutes, allowed to cool, and subsequently lifted off the glass surface and mounted onto an 8×12 inch frame. The mounted film was placed in a furnace. The furnace was heated from 120 to 250° C. (16° C./min), then held at 250° C. for 20 minutes. The film was removed "hot" from the oven after heating to 250° C. for 20 minutes and allowed to cool in air.

Example 7

For the PAA solution of Example 7 (E7) with a monomer composition of CBDA 0.6/6FDA 0.4//TFMB 0.75/IPDA 0.25, into a 300-ml beaker in a nitrogen purged glove box 4.575 g of TFMB and 0.811 g of isophoronediamine (IPDA, TCI America, Portland, Oreg.) was added along with 89 g of DMAc. 2.237 g of CBDA and 3.378 g of 6FDA was added in three aliquots over three 5-10 minute intervals. The reaction mixture was held at 40° C. during these additions. The reaction was held at 40° C. overnight to a weight average molecular weight, $M_w$=272,000 g/mol with a dispersity of 2.68.

For E7, to prepare a substantially imidized polyimide solution (polyimide amic acid solution), 4.44 g of beta-picoline and 4.86 g of acetic anhydride were combined with the PAA solution. The reaction mixture was stirred at 40° C. for 30 minutes then heated to 80° C. for 3 hours to imidize the solution. 100 g of room temperature polymer solution was poured into 300 ml of methanol in a blender and rapidly stirred to pulverize the polymer solid. The pulverized polymer solid was allowed to stir in the blender for 10 minutes before collection by filtration. The polymer solid was then washed with an additional 100 ml of methanol. The polymer was air dried overnight.

For E7, 5 g of the dried polymer resin was added to 45 g of DMAc and mixed in a centrifugal-planetary mixer to obtain a solution. The solution was de-gassed using the centrifugal-planetary mixer to force the gas from the polymer at 2000 rpm for 10 minutes.

The solution was cast onto a glass substrate at 25° C. to produce 1-2 mil cured films. The film on the glass substrate was heated to 80° C. for 25 minutes, allowed to cool, and subsequently lifted off the glass surface and mounted onto an 8×12 inch frame. The mounted film was placed in a furnace. The furnace was heated from 120 to 250° C. (16° C./min), then held at 250° C. for 20 minutes. The film was removed "hot" from the oven after heating to 250° C. for 20 minutes and allowed to cool in air.

Table 3 shows that polyimide films with excellent optical properties can be produced using a range of aromatic/aliphatic dianhydride and aromatic/aliphatic diamine monomer compositions, such as CBDA 0.6/6FDA 0.4//TFMB 0.75/HMDA 0.25 (E6) and CBDA 0.6/6FDA 0.4//TFMB 0.75/IPDA 0.25 (E7).

TABLE 3

| Example | Thickness (μm) | a* | b* | L* | YI (E313) |
|---|---|---|---|---|---|
| E6 | 38.9 | −0.35 | 1.10 | 95.19 | 1.82 |
| E7 | 41.7 | −0.36 | 1.11 | 95.14 | 1.83 |

Example 8

For the PAA solution of Example 8 (E8), with a monomer composition of 6FDA 0.6/CBDA 0.4//TFMB 0.75/PDA 0.25, in a nitrogen purged glovebox, 181.2 g of anhydrous DMAc, 18.021 g of TFMB and 1.391 g 1,3-propanediamine (PDA) are added to a 300-ml beaker equipped with an overhead mechanical mixer. The solution is stirred until the monomers have fully dissolved. 20.000 g of 6FDA and 5.886 g CBDA are added to the stirring solution in a single addition. The reaction mixture is stirred at room temperature overnight, or for a minimum of 18 hours.

To solution imidize, 29.21 g of beta-picoline and 28.37 g of acetic anhydride are added to the PAA. The solution is heated at 40° C. and stirred overnight, or for a minimum of 18 hours. Precipitation is carried out by slowly adding 1000 g of methanol to room temperature polymer mixture. The solids are collected by vacuum filtration, air dried for 24 hours and finally dried under vacuum at 150° C. for 8 hours.

Films can be formed by doctor blade coating onto a glass substrate of a degassed 15 to 30 wt % polymer solution in DMAc, drying the film at 80° C. for 30 minutes or until the film is no longer tacky and releases from the glass. The released film is mounted to a frame and heated from 150 to 250° C. over 15 minutes. The film is removed and allowed to cool to room temperature.

Example 9

For the PAA solution of Example 9 (E9), with a monomer composition of 6FDA 0.6/CBDA 0.4//TFMB 0.75/BDA 0.25, in a nitrogen purged glovebox, 182.2 g of anhydrous DMAc, 18.021 g of TFMB and 1.654 g 1,4-butanediamine (BDA) are added to a 300-ml beaker equipped with an overhead mechanical mixer. The solution is stirred until the monomers have fully dissolved. 20.000 g of 6FDA and 5.886 g CBDA are added to the stirring solution in a single addition. The reaction mixture is stirred at room temperature overnight, or for a minimum of 18 hours.

To solution imidize, 29.21 g of beta-picoline and 28.37 g of acetic anhydride are added to the PAA. The solution is heated at 40° C. and stirred overnight, or for a minimum of 18 hours. Precipitation is carried out by slowly adding 1000 g of methanol to the room temperature polymer mixture. The solids are collected by vacuum filtration, air dried for 24 hours and finally dried under vacuum at 150° C. for 8 hours.

Films can be formed by doctor blade coating onto a glass substrate of a degassed 15 to 30 wt % polymer solution in DMAc, drying the film at 80° C. for 30 minutes or until the film is no longer tacky and releases from the glass. The released film is mounted to a frame and heated from 150 to 250° C. over 15 minutes. The film is removed and allowed to cool to room temperature.

E8 and E9 are additional examples of polyimide films produced using a range of aromatic/aliphatic dianhydride and aromatic/aliphatic diamine monomer compositions.

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A polyimide film comprising:
 a dianhydride and a diamine, wherein:
 the dianhydride, the diamine or both the dianhydride and the diamine comprise an alicyclic monomer, an aliphatic monomer or both an alicyclic monomer and an aliphatic monomer; and
 the polyimide film has an L* of at least 90, a b* of 1.25 or less, a yellowness index of 2.25 or less and a haze of less than 1% for a film thickness of 50 μm; and the polyimide film is formed by:
   (a) polymerizing the dianhydride and the diamine in the presence of a first solvent to obtain a polyamic acid solution;
   (b) imidizing the polyamic acid solution to form a substantially imidized solution, wherein greater than 85% of the amic acid groups are converted to polyimide, as determined by infrared spectroscopy;
   (c) casting the substantially imidized solution to form a film; and
   (d) drying the film.

2. The polyimide film of claim 1, wherein after (b) and before (c), the substantially imidized solution is filtered to remove insoluble constituents of the solution.

3. The polyimide film of claim 1, wherein the dianhydride is selected form the group consisting of 4,4'-(hexafluoroisopropylidene)diphthalic anhydride, 3,3',4,4'-biphenyltetracarboxylic dianhydride, 3,3',4,4'-benzophenonetetracarboxylic dianhydride, 3,3',4,4'-diphenylsulfonetetracarboxylic dianhydride and mixtures thereof.

4. The polyimide film of claim 3, wherein the dianhydride further comprises an alicyclic dianhydride selected from the group consisting of cyclobutane-1,2,3,4-tetracarboxylic dianhydride, 1,2,4,5-cyclohexanetetracarboxylic dianhydride, 1,2,3,4-cyclohexanetetracarboxylic dianhydride, 1,2,3,4-cyclopentanetetracarboxylic dianhydride, hexahydro-4,8-ethano-1H,3H-benzo[1,2-c:4,5-c']difuran-1,3,5,7-tetrone, 3-(carboxymethyl)-1,2,4-cyclopentanetricarboxylic 1,4:2,3-dianhydride and meso-butane-1,2,3,4-tetracarboxylic dianhydride.

5. The polyimide film of claim 1, wherein the diamine comprises a fluorinated aromatic diamine.

6. The polyimide film of claim 5, wherein the fluorinated aromatic diamine comprises 2,2'-bis(trifluoromethyl) benzidine.

7. The polyimide film of claim 1, wherein the diamine comprises an aliphatic diamine selected from the group consisting of 1,2-diaminoethane, 1,6-diaminohexane, 1,4-diaminobutane, 1,5 diaminopentane, 1,7-diaminoheptane, 1,8-diaminooctane, 1,9-diaminononane, 1,10-diaminodecane, 1,11-diaminoundecane, 1,12-diaminododecane, 1,16-hexadecamethylenediamine, 1,3-bis(3-aminopropyl)-tetramethyldisiloxane, isophoronediamine, bicyclo[2.2.2]octane-1,4-diamine and mixtures thereof.

8. The polyimide film of claim 1, wherein the diamine comprises an alicyclic diamine selected from the group consisting of cis-1,3-diaminocyclobutane trans-1,3-diaminocyclobutane, 6-amino-3-azaspiro[3.3]heptane, and 3,6-diaminospiro[3.3]heptane, bicyclo[2.2.1]heptane-1,4-diamine, isophoronediamine, bicyclo[2.2.2]octane-1,4 diamine, cis-1,4 cyclohexane diamine, trans-1,4 cyclohexane diamine, 1,4-bis(aminomethyl)cyclohexane, 4,4'-methylenebis(cyclohexylamine), 4,4'-methylenebis(2-methyl-cyclohexylamine), bis(aminomethyl)norbornane and mixtures thereof.

9. The polyimide film of claim 1, wherein the polyimide film has a thickness in the range of from 10 to 150 μm.

10. An electronic device comprising the polyimide film of claim 1.

11. The polyimide film of claim 1, wherein the polyimide film has a b* of 1.0 or less for a film thickness of 50 μm.

12. The polyimide film of claim 1, wherein the polyimide film has a yellowness index of 2.0 or less for a film thickness of 50 μm.

* * * * *